US006892671B1

(12) United States Patent
    Miyawaki

(10) Patent No.: US 6,892,671 B1
(45) Date of Patent: May 17, 2005

(54) ANIMAL REGISTRATION MANAGEMENT SYSTEM CAPABLE OF ANIMAL IDENTIFICATION

(75) Inventor: Yutaka Miyawaki, Tokyo (JP)

(73) Assignee: Surge Miyawaki Co., Ltd., Tokyo (JP)

( * ) Notice: Subject to any disclaimer, the term of this patent is extended or adjusted under 35 U.S.C. 154(b) by 0 days.

(21) Appl. No.: 09/622,793

(22) PCT Filed: Dec. 24, 1999

(86) PCT No.: PCT/JP99/07297

§ 371 (c)(1),
(2), (4) Date: Aug. 23, 2000

(87) PCT Pub. No.: WO00/38507

PCT Pub. Date: Jul. 6, 2000

(30) Foreign Application Priority Data

Dec. 24, 1998 (JP) ................................. 10-367959

(51) Int. Cl.$^7$ ........................... A01K 29/00; G09F 3/00
(52) U.S. Cl. ........................................ 119/174; 40/300
(58) Field of Search ......................... 119/51.02, 174, 119/858, 906, 759; 40/1.5, 300, 303

(56) References Cited

U.S. PATENT DOCUMENTS 4,260,646 A * 4/1981 Farrell et al. ............... 119/174
5,322,034 A * 6/1994 Willham et al. ............ 119/174
6,318,289 B1 * 11/2001 Pratt ......................... 119/51.02
6,439,169 B1 * 8/2002 Miyawaki ................... 119/858

FOREIGN PATENT DOCUMENTS

| EP | 0 821 912 A2 | 3/1998 |
| JP | 1-265835 | 10/1989 |
| JP | 10-275236 | 10/1998 |

* cited by examiner

Primary Examiner—Teri Pham Luu
Assistant Examiner—Elizabeth Shaw
(74) Attorney, Agent, or Firm—Finnegan, Henderson, Farabow, Garrett & Dunner, L.L.P.

(57) ABSTRACT

An animal registration management system which enables the individual identification of an animal correctly, quickly, and at a low cost using an animal identifier. This system is an animal registration management system which enables individual identification of an animal by an identifier printed or recorded with an animal registration number belonging to a predetermined management organization, wherein when an animal breeder registers an animal at a management organization, it first obtains an identifier, then reports an animal registration number included in the identifier to the management organization together with individual information unique to the animal which the breeder desires to register, then the management organization registers the reported animal registration number and the individual information in its database and issues an animal registration certificate linking the animal registration number and the individual information. The report can be made by an animal registration application form attached to the identifier.

22 Claims, 10 Drawing Sheets

Fig.1B

LIVESTOCK REGISTRATION APPLICATION

Registration No. 123456789

Please attach a photo of cow (left side) or attach hair with root

Date of Birth: 5/5/1998
Sex: Male (Female)
Father: 385763 Guts Power
Mother: 587363 Queen Momo
Colour of Hair: 1. B & W   2. Black
　　　　　　　　3. Brown  4. R & W
　　　　　　　　5. Other
Breed: Holstein
Name: Milky Applicant
Address: 〒088-0096  1 Midorimachi, Wakkanai-shi, Hokkaido
Name: Taro Yamada
Contact Number: 010-234-5661

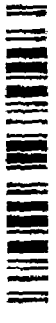

Fig.10B

REGISTRATION APPLICATION

Registration No. 1 2 3 4 5 6 7 8 9

Date of Birth: 5/5/1998
Sex: Male Female
Father: 123558 Taro
Mother: 883321 Hanako
Color of Hair: Gold
Breed: Golden Retriever
Name: Pat Applicant
Address: 〒156
3-10-4 Akazutsumi
Setagaya-ku, Tokyo-to
Name: Yutaka Miyawaki
Contact Number: (03)-1234-5678

Please attach hair with root

ANIMAL REGISTRATION MANAGEMENT SYSTEM CAPABLE OF ANIMAL IDENTIFICATION

TECHNICAL FIELD

The present invention relates to an animal registration management system enabling individual identification of animals, more particularly relates to an animal registration management system enabling individual identification of animals by using tags attached to the ears of animals.

BACKGROUND ART

For registration of livestock, Japan has previously known the use of nose prints as with its cattle registration association and use of the pattern of black and white spots of Holstein dairy cattle as with its Holstein registration association.

On the other hand, Europe has used the pattern of spots for Holsteins in the same way as in Japan and also tattoos and ear punching. Recently, however, it has been registering dairy cattle using ear tags.

For breeding animals like dogs and cats, the method of management by implantation of a microchip storing a registration number is known. For ruminating animals, it is proposed to register them by making them ingest a microcapsule storing a registration number which will then remain in their stomachs.

While the registration of livestock using registration certificates as used for cattle in Japan was reliable, there was the problem that animals could not be confirmed in the field without the registration certificates and therefore quick confirmation of individuals was not possible.

Also, in the European method, the ear tag only carries part of the unique livestock registration number. While it is possible to issue a registration number unique to an individual on a national level, the practice when confirming an individual at the time of registration is to only check the date of birth as calculated from the date of artificial insemination. Therefore, it is not possible to check whether the livestock in question is really the right one. This is because several calves are often born on the same day. Also, there are individual differences in the gestation periods. Accordingly, registering births using just the date of parturition as the check item easily results in errors. Further, even if the wrong information is entered, there is no means to find the error and correct it. Namely, there is the possibility of mistakenly registering a calf different from a blood line entered at the time of the artificial insemination.

A similar method is adopted for dogs as well. Critics have pointed to problems in its reliability as well.

That is, microchips, when initially developed, were said to be tamper-proof individual identifiers, but not only have there been mistaken attachment, breakdowns due to the fact they are industrial products and damage due to accidents, but also international standardization has made it possible for anyone to copy microchips even legally. Therefore, the reliability has been falling.

As explained above, conventional animal registration systems have had the problems that they are impractical if priority is given to reliability in identification of individuals and conversely are unreliable if priority is given to practicality.

DISCLOSURE OF THE INVENTION

Therefore, an object of the present invention is to provide an animal registration management system using individual identifiers, especially ear tags, which enables the most important individual identification correctly, quickly, and practically at a low cost.

The features of the present invention for achieving the above object are shown below as first to 12th aspects of the invention.

In the first aspect, there is provided an animal registration management system which enables individual identification of an animal by an identifier printed or recorded in some form or another with an animal registration number belonging to a predetermined management organization, wherein when an animal breeder registers an animal at a management organization, it first obtains an identifier, then reports an animal registration number included in the identifier to the management organization together with individual information unique to the animal which the breeder desires to register, then the management organization registers the reported animal registration number and the individual information in its database and issues an animal registration certificate linking the animal registration number and the individual information.

In the second aspect, there is provided the first aspect wherein the reporting means is an animal registration application form attached to the identifier, the animal registration application form is provided with a section for providing individual information of the animal to be registered, and the management organization stores the attached materials including the individual information of the animal which has been sent to it.

In the third aspect, the individual information in the second aspect is hair of the animal.

In the fourth aspect, the individual information in the second aspect is a scraping of mucous membrane taken from the animal.

In the fifth aspect, the individual information in the second aspect is blood, a body fluid, or other biological specimen.

In the sixth aspect, the reporting means in the first aspect is the animal registration number included in the identifier and image data of individual information unique to the animal, the animal breeder reports to the management organization by data communication or by sending a medium containing the data, and the control organization registers that data of the reported animal registration number and individual information in its database.

In the seventh aspect, the image data of the individual information in the sixth aspect is an image of the pattern of spots of the body of the animal.

In the eighth aspect, the image data of the individual information in the sixth aspect is a nose print of the animal.

In the ninth aspect, the image data of the individual information in the sixth aspect is an image of whorls of the hair of the face part and torso of the animal.

In the 10th aspect, the image data of the individual information in the sixth aspect is an image of an iris of an eye of the animal.

In the 11th aspect, a person which desires to register the animal at the management organization car select from at least one reporting means of the second to 10th aspects without regard as to the type of the animal.

In the 12th aspect, the reporting means in the second or sixth aspect requests identification of the person sampling the individual information unique to the animal or the recorder.

The individual information of the animals originates from the physical characteristics of the animals and functions to guarantee the reliability of the system. Individual identification in the conventional registration certificate system did not enable confirmation of the individual without referring to a unique portion of the animal such as the pattern of spots on its body or its nose print, but according to the present invention, it is not necessary to refer to the unique information of the animal except under special circumstances, for example, when information on the blood line of the individual etc. is required or reconfirmation of the individual registration number is required for the purpose of commercial transactions or prevention of theft.

The reason for this is that, according to the present invention, the fact that an identifier such as an ear tag printed or recorded with the animal registration number is attached to the animal in an unchangeable state and the fact that the application form registered at the animal registration organization is provided with a portion for information unique to the animal together with the animal registration number means that while the format of the data differs, the data is theoretically the same.

As opposed to this, in the European cattle registration system, the scheduled date of birth is estimated based on the data of artificial insemination of the livestock and the calf confirmed with reference to that, so there is no guarantee that the registered calf is really the calf of the registered data and therefore is vastly different in reliability from the system of the present invention. The reason is that the gestation period differs depending on the individual animal.

If the individual information is hair as in the third aspect, it is very simple to take a sample and attach it to the registration application form and store it. Hair enables confirmation of whether an individual is the same in question by checking the DNA, so is most suited to the system of the present invention. Further, if the root is attached along with the hair, the root of the hair contains a lot of tissue suitable for DNA analysis and enables fast and accurate analysis. According to the present invention, so long as assessment of the identity of an individual is not necessary, DNA analysis is unnecessary, so identification is possible at the minimum cost.

Also, the scraping of mucous membrane of individual information in the fourth aspect can easily be taken from the mouth. This is also practical for identifying the individual by DNA analysis.

The blood, body fluid, or other biological specimen of the individual information in the fifth aspect has information unique to the individual such as the blood type in the case of blood, the DNA, etc. By testing and analyzing these, not only can an individual be identified, but also the parental relations and other blood relations can be proved, so these are very effective.

The image pattern of spots of the body of an animal used for individual information in the seventh aspect is claimed since, for example, a pattern of black and white spots is a feature of Holstein dairy cattle and is already being used by the Holstein registration association, so enables this to be entered in this animal registration system as it is without making any changes.

The image of a nose print of an animal used for individual information of animals in the eighth aspect is claimed since nose prints are already used for the registration of Japanese breeds of cattle which have uniform hair color, so enables construction of an animal registration system without changing the existing system of the registration association, so enables immediate construction at a low cost.

An image of the whorls of hair at the face and torso of an animal used for individual information in the ninth aspect and an image of the iris of an eye of an animal used in the 10th aspect are claimed because they have the advantage of being able to be recognized by anyone. Note that when converting these features to images, due to the increase in capacity of storage media in recent years, it is becoming possible to convert them to moving images in addition to still images.

Also, if not limiting the individual information required at the time of application for registration as in the 11th aspect, the registration becomes more convenient to the applicant. In previous systems, a certain type of livestock had a certain specific method of registration. No others were accepted. In the system of this aspect, however, the unique portion of an animal is only a guarantee at the time when a problem arises, so there is no need to limit the system to any one type of information.

This is because, if a problem arises, it is sufficient to examine whether the unique portion of an animal already sent to the registration management center at the time of registration matches that of the actual animal in question.

Furthermore, if the person who takes or records the individual information is specified as in the 12th aspect, for example, if the name of the person who took the unique portion of the individual attached to the animal registration application form and the date or the equivalent are recorded, the person who takes the unique portion of the individual attached can be held responsible for the work and therefore where responsibility lies can be clarified and the reliability of the system can be enhanced.

BRIEF DESCRIPTION OF THE DRAWINGS

These and other objects, features, advantages, etc. of the present invention will be explained in detail next in accordance with embodiments shown in the attached drawings, wherein

FIG. 1B is an enlarged view of a livestock registration application form of FIG. 1A.

FIG. 9B is an enlarged view of a livestock registration application form of FIG. 9A.

FIG. 10B is an enlarged view of the registration application form of FIG. 10A.

BEST MODE FOR CARRYING OUT THE INVENTION

First, an animal registration management system which enables individual identification of an animal in the case of use of cattle as the animal and an ear tag as the identifier will be explained.

Figure 1A:
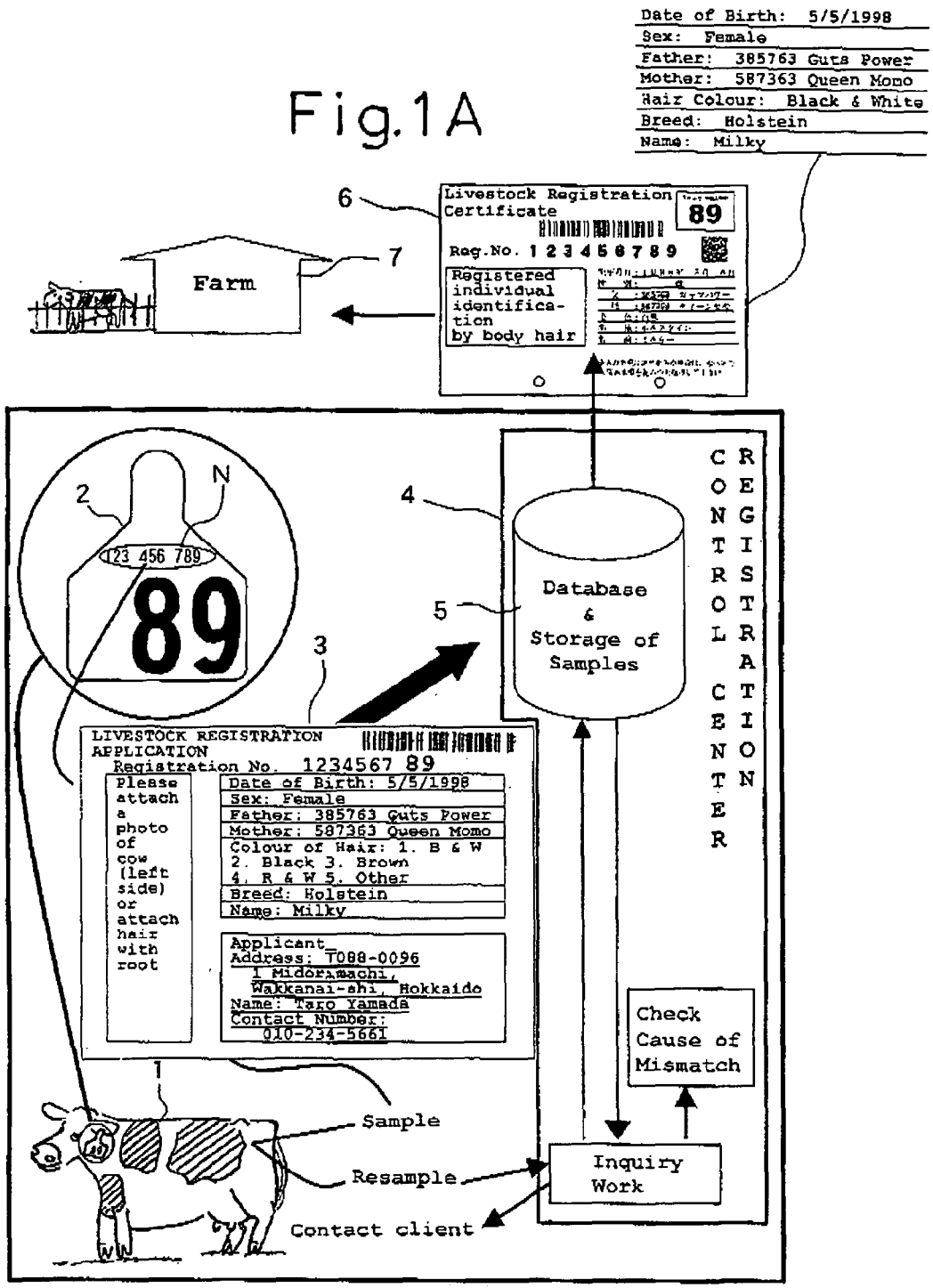
FIG. 1A is schematic view of a first embodiment of the system of the present invention.

FIG. 1A is a schematic view of a first embodiment of the system of the present invention. The cow 1 at the center represents all livestock such as pigs, sheep, horses, goats, deer, reindeer, etc. and has an ear tag 2 printed with a livestock registration number N attached to its ear. This ear tag 2 can be sent from the registration management center in advance or can be purchased at a designated outlet of the agricultural cooperative by an applicant for the registration of livestock. The data of the livestock registration number N is entered into the database at the management center 4 from the registration application form 3 which the applicant for registration of the livestock sends to the management center 4.

FIG. 1B shows the enlargement of this registration application form 3. At this time, in the present invention, unique individual information of the animal is attached to this registration application form and registered along with the livestock registration number N.

The individual information of the unique portion of the animal attached to the registration application form 3 is, in the first embodiment, hair pulled from the roots. The hair is attached to the registration application form 3.

The registration application form 3 with the hair attached is sent to the registration management center 4, where the livestock registration number N and the individual information are registered in the database 5 of the registration management center 4. After registration, the management center 4 issues a livestock registration certificate 6.

The registration management center 4 returns the issued livestock registration certificate to the farm 7 and thereby completes its work. The livestock registration certificate 6 clearly indicates what was used as the unique portion of the animal. The management center 4 normally does not immediately conduct a DNA analysis of the sample of the hair, but stores the hair in a preserved state.

When a circumstance such as an important transaction makes it necessary for the management center 4 to reconfirm the information to ensure reliability, the farm 7 or client again takes a sample of the hair from the cow 1 desired to be confirmed and sends it to the predetermined management center 4. The management center 4 then check it against the sample taken at the time of registration. If the result of the check shows the cow is the same, the farm 7 is informed of the confirmation, while if there is a difference, the farm 7 is informed of the difference and, as necessary, the cause of the difference is checked by the management center 4. When the result of the check is that the cow is different, action is taken against the responsible parties according to whether the difference was deliberate.

By making this an established practice, it will become possible to construct an animal registration management system which enables a more highly reliable individual identification of animals.

The advantage of the system of the present invention is that since only the ear tag 2 is used for normal identification of an individual and the unique portion of the animal is not used, even extremely small scale operations can start the system at any time without great cost and a highly reliable livestock registration system can be started.

Especially, in a country like Japan where there are different practices according to the species of the livestock or region, the advantage of the system of the present invention is that at the initial stage, livestock registration systems can be started in scattered forms and as the situation changes a comprehensive system can be constructed. This gives it great practical value considering the current situation in Japan.

In FIG. 1A, the livestock registration number N is printed on the ear tag 2, but it can also be recorded in microchip or metal barcode or magnetic media. In this case, it is possible to construct a system for registering livestock using an image storing medium explained later and a communications medium without use of paper. The checking procedure is the same.

Figure 2:
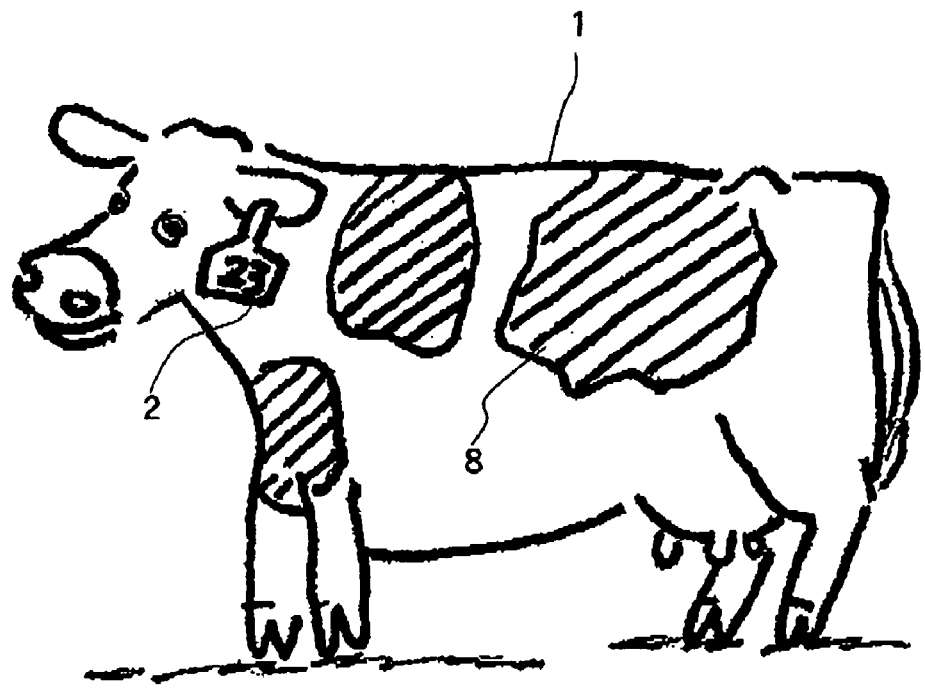
FIG. 2 is an example of an image of individual information in a second embodiment of the present invention.
Figure 3:
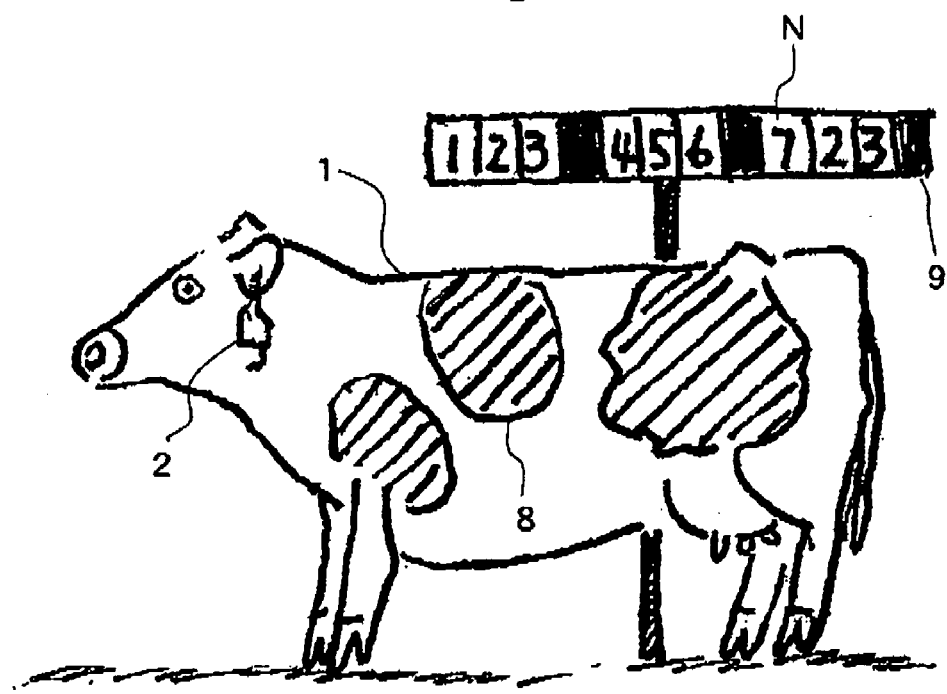
FIG. 3 is a view of an example of an image of individual information in a third embodiment of the present invention.

FIG. 2 and FIG. 3 show second and third embodiments of unique portions of an animal. The individual information shown here are images stored in recording media. In these examples, the patterns of spots 8 on the torso of the cow 1 are recorded in the recording media.

FIG. 2 is a picture of a cow 1 taken after an ear tag 2 is attached so as to enable the number of the ear tag 2 to be read. By taking a picture of the cow 1 and the number of the ear tag 2, not only is it possible to prevent mistaken registration of photos, but also the work of checking can be performed faster and more reliably when checking of the pattern of spots 8 is necessary.

FIG. 3 is a picture of signboard 9 which shows the livestock registration number N together with a cow 1 having a pattern of spots 8 as its unique individual information. This kind of composition is hard to reconstruct artificially and can thus deter illegal usage at the same time. If the picture at this time is taken with the ear tag 2 attached, it is possible to prevent mistaken entries at the time of registration and also facilitate checking.

Figure 4:
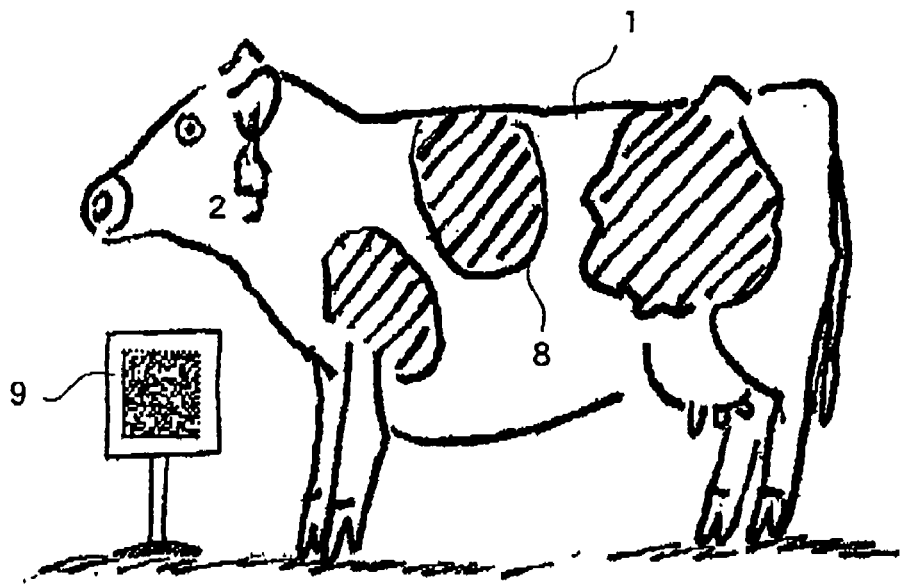
FIG. 4 is a view of an example of an image of individual information in a fourth embodiment of the present invention.

FIG. 4 shows a fourth embodiment where the livestock registration number N is electrically input into an image recording medium inside a camera. The numbers at the bottom right show the livestock registration number N. Such input of the livestock registration number N into an image recording medium generally takes the picture as a still image, but recent advances in digital technology have made it possible to record the livestock registration number N in the image as an index, even in the case of a moving image, and to use this to retrieve the moving image later.

Figure 5:
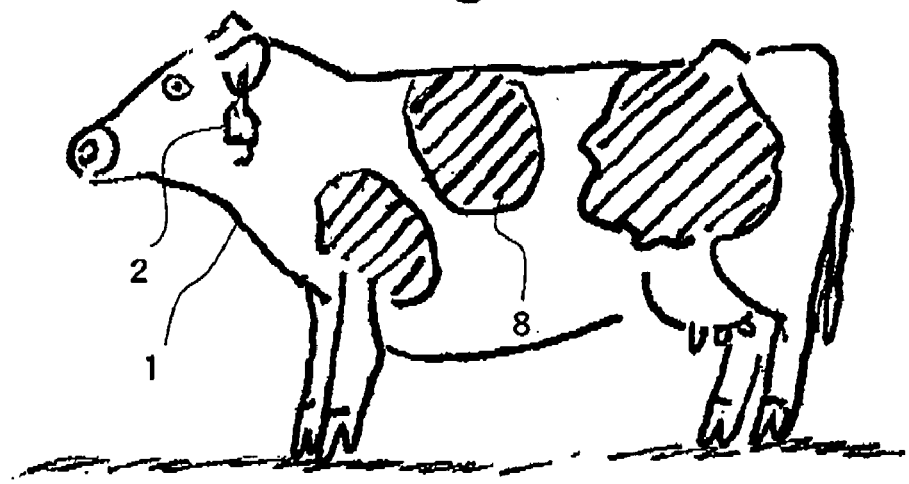
FIG. 5 is a view of an example of an image of individual information in a fifth embodiment of the present invention.

FIG. 5 shows a fifth embodiment where, in addition to the above embodiment, a barcode 10 is also input into the recording medium by an electrical method. The reason why a barcode 10 is added to the recording medium is that it enables the accuracy and speed the processing to be improved when taking out the storage medium as a single set of data and processing the information on a different system.

Figure 6:
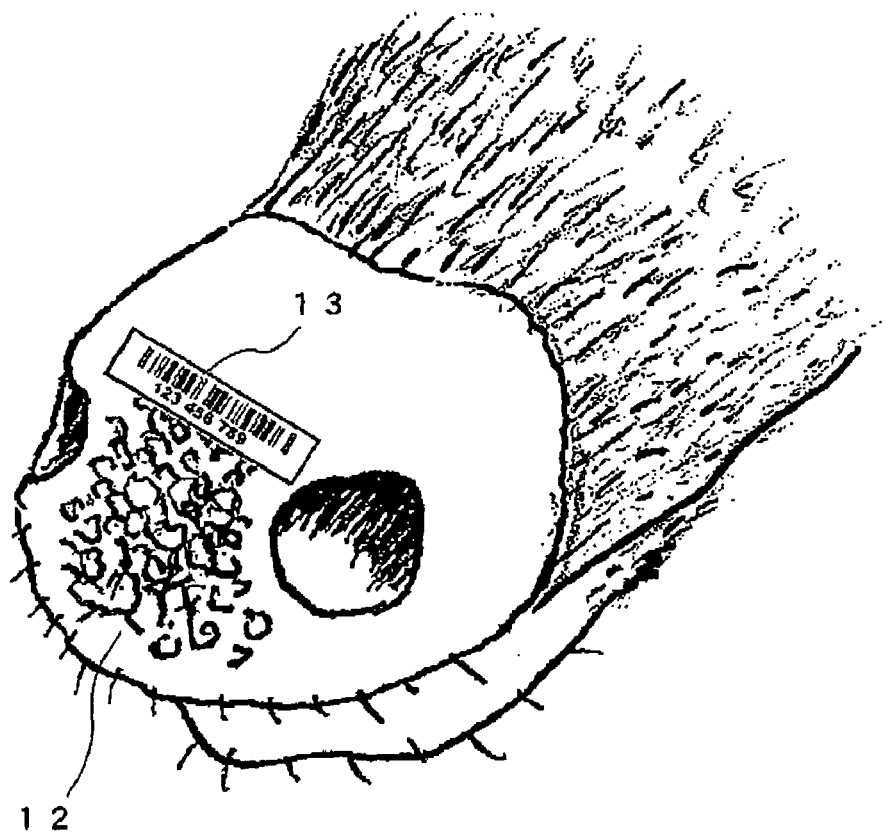
FIG. 6 is a view of image information in a sixth embodiment of the present invention.

FIG. 6 shows a sixth embodiment where a barcode seal 13 printed with the livestock registration number is temporarily attached to the photographed area of the nose print 12 of the cow 1 and the nose print 12 and the barcode seal 13 are simultaneously photographed to produce a picture. Several methods for taking the nose print 12 have already been proposed, but since the livestock registration number is added to the image of a nose print 12 later, input errors tend to occur. The pattern of black and white spots of a cow can be easily discriminated by anyone, so it is possible to input a registration number after taking a picture while checking it, but it is close to impossible to check a nose print 12. Therefore, being able to input the livestock registration number (barcode) and the unique portion of the animal (nose print) into the storage medium simultaneously in the same image not only makes the reliability of the data very high, but also makes handling very simple. This is an important technique essential in managing data on media. The same is true for the iris of the eye of a cow.

Figure 7:
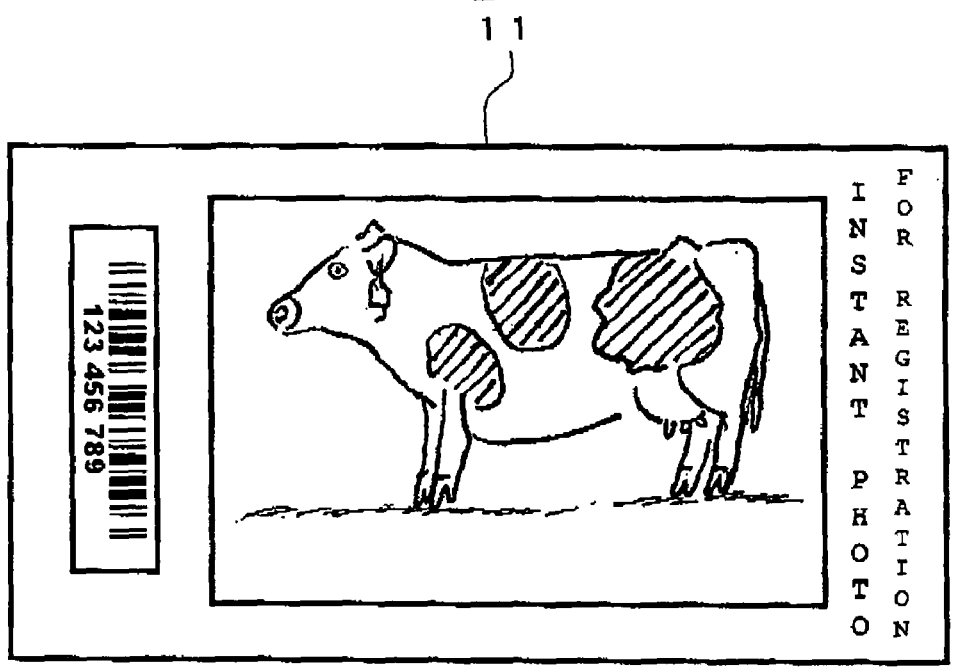
FIG. 7 is a view of image information in a seventh embodiment of the present invention.

FIG. 7 shows a seventh embodiment where the individual information is an instant photo 11. An instant photo 11 is taken by an instant camera, then a barcode seal packaged with the ear tag 2 is adhered to an empty space. In this example, an inexpensive system already on the general market may be used to construct a highly reliable livestock registration system.

Note that as unique information of livestock to be storage medium, there is also the whorl of the hair (on the face and the torso) in addition to the above embodiments.

Figure 8:
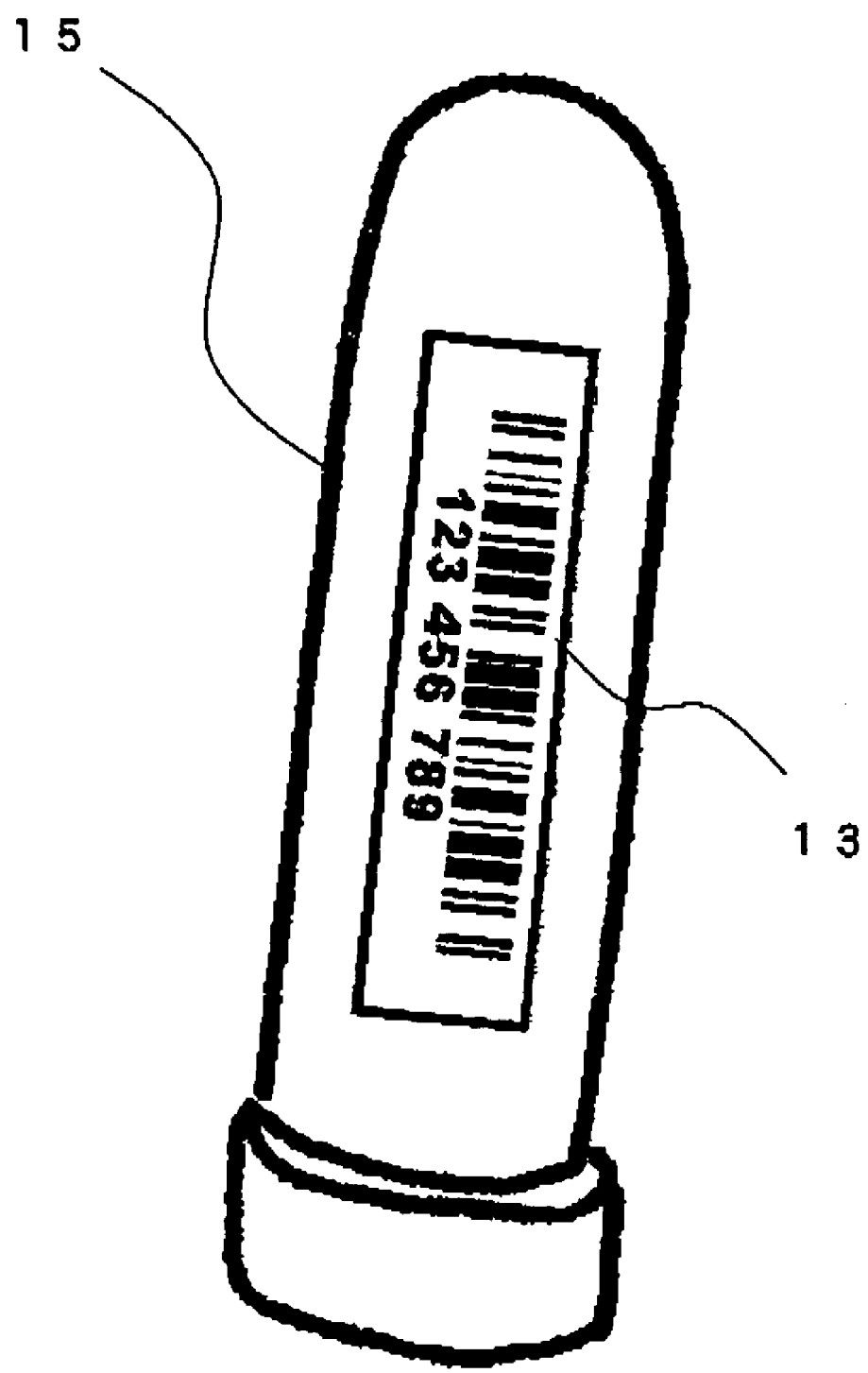
FIG. 8 shows a perspective view of a container which stores individual information in an eighth embodiment of the present invention.

Next, as an eighth embodiment of the present invention, an explanation will be given of the case where the unique portion of the animal is the sample of blood or a scraping of mucous membrane of the cow. In this case, the blood or scraping of the mucous membrane is generally placed into a container. In the case of use of a container, a barcode showing the livestock registration number N is attached to the container 15 as shown in FIG. 8. By doing this, processing can be performed accurately and quickly.

In the system of the present invention, there is no need to specify any one unique portion of an animal. The reason is that identification of a certain individual only requires that one part be sampled. While the system as a whole is desirably standardized to a certain extent, this is not a requirement. Therefore, it is enough that something which is easily sampled from livestock and which has been sampled as conventional practice be used as it is.

However, the persons taking samples of the unique portions of livestock are the heart of the livestock registration management system of the present invention. It is necessary to hold them responsible for the work. This is required in improving the reliability of the animal registration management system. Therefore, as a minimum condition, it is better to make it compulsory that the person taking the sample of the unique portion of livestock enter his or her name and the date of the work or something corresponding to this on the registration application form or record the same in a medium.

A person's identity can confirmed by fingerprints or by a one-dimensional or two-dimensional barcode in addition to the method of the person himself or herself entering the required information. For example, if the information of the worker is written by a two-dimensional barcode on the signboard shown at the bottom left of FIG. 4, it is possible to increase the reliability of the data further.

Figure 9A:
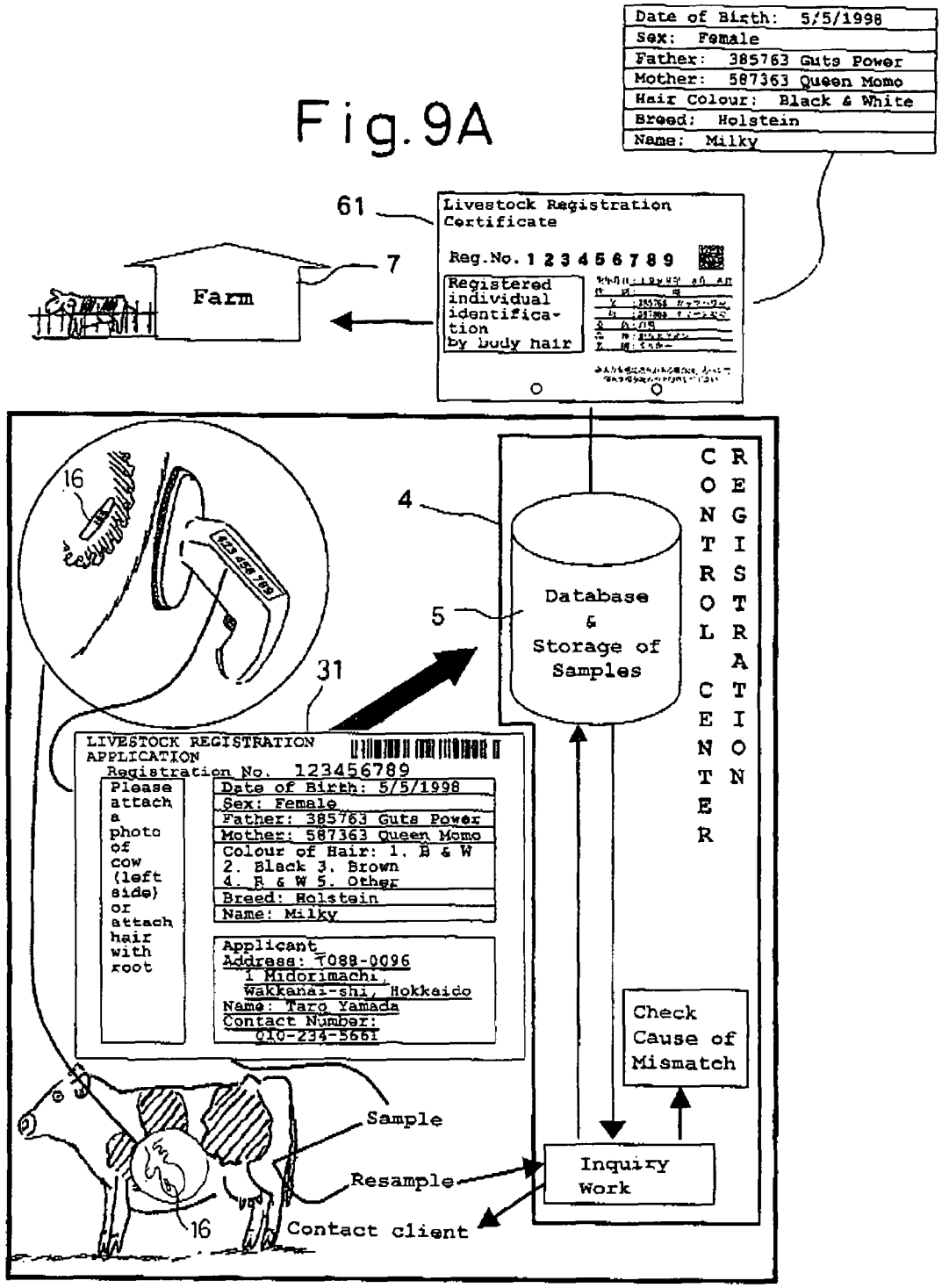
FIG. 9A is a schematic view of a ninth embodiment of a system of the present invention.

FIG. 9A shows a ninth embodiment of the present invention wherein a cow is made to ingest a microchip 16 and retain it in its stomach as an identifier. FIG. 9B shows an enlargement of the livestock registration application form 31 of FIG. 9A. The individual information of the unique portion of the animal to be attached to the registration application form 31 can be made the animals hair pulled out from its roots in the same way as the first embodiment. This hair is attached to the registration application form 31.

The registration application form 31 with the hair attached is sent to the registration management center 4, where the livestock registration number N and the individual information are registered in a database 5 of the registration management center 4. After registration, the management center 4 issues a livestock registration certificate 61 and sends it to the farm 7.

Figure 10A:
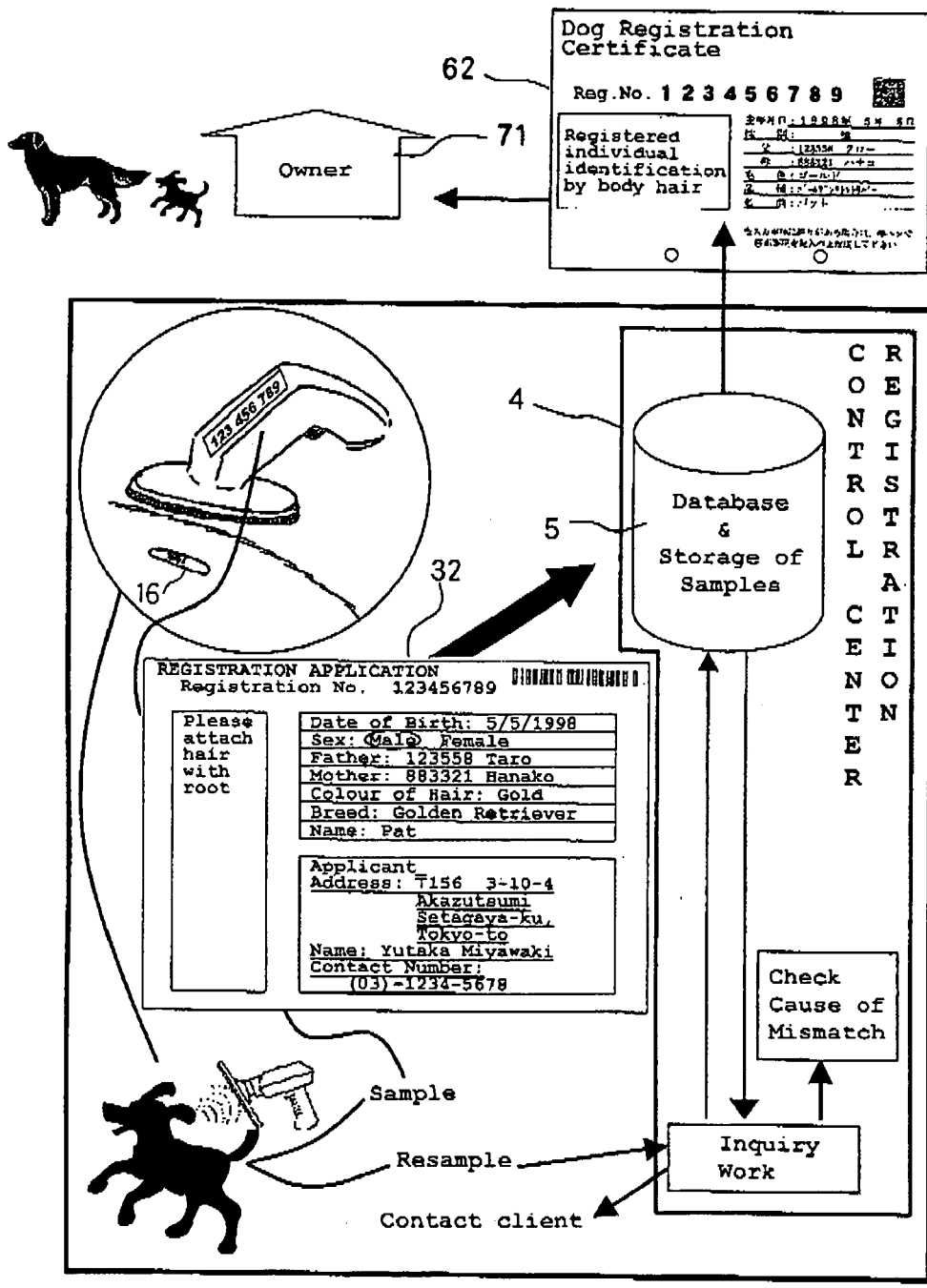
FIG. 10A is schematic view of a 10th embodiment of a system of the present invention.

Further, FIG. 10A shows a 10th embodiment wherein a microchip 16 is implanted into a dog. FIG. 10B shows an enlargement of the registration application form 32 of FIG. 10A. The individual information of the unique portion of the dog attached to the registration application form 32 can be made the hair pulled out from its roots in the same way as the first embodiment. This hair is attached to the registration application form 32.

The registration application form 32 with the hair attached is sent to the registration management center 4, where the dog's registration number and the individual information are registered in a database 5 of the registration management center 4. After registration, the management center 4 issues the dog registration certificate 62 and sends it to the owner 71.

In these examples, a reader is necessary to read the registration number recorded on the microchip 16. In these examples, even if there are mistakes in implanting the microchip 16, breakdowns, or the illegal acts of duplicating the same numbers, a follow-up study can be made to determine the cause in the same way as with the ear tags.

Note that in the above embodiments, the explanation was given using mainly livestock as an example of the animals, but the animals are not particularly limited to livestock.

CAPABILITY OF UTILIZATION IN INDUSTRY

According to the system of the present invention, a livestock registration system can be started up in diverse forms and then put together. This not only keeps the initial investment to a minimum, but can also handle regional customs which would otherwise prove an obstacle at the start. Therefore, the system can be established quickly.

This is because while the European method required the construction of a the data base of artificial insemination records beforehand for the identification of individuals, according to the present invention, the system can be constructed even without starting up an enormous database from the start as in Europe since the data registered is the same in content, though different in form, as with actual animals with livestock registration ear tags.

Furthermore, the cases of births from the implantation of inseminated embryos without artificial insemination or from direct mating with males were hard for the European system to handle since it was based on artificial insemination data, but in the livestock registration management system of the present invention, individual information is not based on breeding data, so these cases can be sufficiently handled even under the current conditions.

Also, according to the system of the present invention, even if an ear tag or other identifier reissued due to an ear tag or identifier falling off is mistakenly attached, since the unique information of the animal is attached to the registration application form, it is possible to construct a check system and conduct a follow-up investigation using only the ear tag or identifier and the registration data base.

This means that it is possible to trace back erroneous data on the system and clarify the mistake or correct it.

As opposed to this, in the European system, it is difficult to track back mistaken attachment once it occurs. The reason is that the only information used for confirming an individual at the time of registration is the scheduled date of parturition. There is no way to try to prove that the individual with an ear tag is truly the one in question.

When necessary to do this at all costs, the blood type or DNA of not only the single cow in question, but substantially all the related cows and those of the parents have to be compared against each other to deduce the truth. A tremendous amount of time and effort are therefore required when trouble occurs.

Further, according to the system of the present invention, since it is possible to check for misuse by switching in addition to the above tracing action, the additionally required expense at the time of trouble can be kept to the minimum necessary. This is because the system of the present invention is simple and enables provision of a livestock registration system that is very reliable.

Further, according to the present invention, since it is possible to search through still images or moving images for the image of an animal using the recent multimedia and the Internet and other communications means, anyone can easily make checks. For example, when the pattern of black and white spots, nose print, hair whorls, and other visible features as the unique information of an animal, the information can be retrieved and the identification of an individual animal can be checked by inputting the livestock registration number on the ear tag.

As opposed to this, in the European method, there is no image data, so this is not possible.

The construction of a system enabling farms or related parties to identify individuals when needed in their free time means greater economic efficiency not only for farmers but also for the nation as a whole managing the livestock. This function is important from the viewpoint of consumer protection as well especially in recent times when the safety of livestock products has been called in question.

According to the system of the present invention, it is also possible to use a system which does not necessarily utilize one individual number for one individual.

Also, in registration, it is ideal if one individual number is used for one individual over its entire lifetime. However, in some cases, this works disadvantageously. Giving a specific example, there is the measure to be taken against detachment of registration ear tags—said to be about 7 percent a year.

Previously, with the system adopted in Europe, an ear tag the same as the lost ear tag is created and sent to the farm upon application. The trouble taken in this refabrication and resending, however, is a problem. Even more than this, however, there was the question as to if the ear tag was really correctly attached to the livestock which the one falling off had been attached to. It is also possible for one to make a false application claiming that an ear tag had fallen off even if it didn't and get it to be reissued, then use the reissued ear tag on another livestock.

According to the system of the present invention, it is possible to construct a system whereby the registration ear tag issuer does not have to reissue a lost ear tag.

The reason is since unique information of the animal is attached at the time of registration, even if an ear tag with a different registration number is attached as an interim measure (confirmation certification), the continuity of individual identification with respect to an individual is guaranteed by the unique portion of the livestock recorded on the registration form. In the case of the system of the present invention, the unique portion is a unique portion of an animal, so cannot be switched. Therefore, the reliability is high.

By the addition of this function, no matter what numbers are used, it is possible to construct a system giving a farm raising livestock or related parties the freedom to select the numbers, color, or size of ear tags in accordance with the situation or necessity.

Therefore, using the livestock registration system of the present invention, even if a country or government is registering the livestock, the farms can be given sufficient freedom, so a system can be constructed which is easy to promote among farms.

Further, as an effect of its application, not only is it possible to supply the ear tags through specific government channels, but it is also possible to distribute them through general agricultural cooperative outlets or general trading companies.

The reason is that since individual animals can be confirmed for each registration in the registration system of the present invention, it becomes unnecessary to send ear tags to specific farms as in the past or insert a farm code in part of the livestock registration number when sending ear tags.

Due this, the principle of competition comes into play in the supply of ear tags and distribution costs can be greatly reduced. Also, even when ear tags fall off, it is not necessary to wait for a reissued ear tag to arrive as in the European system. It is possible to attach an ear tags from one's stock on hand or obtained in a nearby agricultural supply outlet and then re-register. Therefore, when an ear tag falls off, it is possible to minimize the time no ear tag is attached, reduce the risk of mistaken attachment of ear tags due to the time lag, and otherwise greatly improve the convenience in the field.

As explained above, by using the system of the present invention, it is possible to establish a livestock registration and individual identification system of a high reliability, a high degree of freedom for the farm, and superior convenience at an extremely low cost, so the economic effect is great.

Further, in the case of the registration of dogs and cats using microchips as identifiers, even if using standardized microchips not necessarily guaranteed in uniqueness, since unique portions of the animals are attached at the time of registration, it is possible to construct a highly reliable registration system for dogs, cats, and other animals preventing illegal acts. In this way, the capability of utilization in industry of the system of the present invention is great.

What is claimed is:

1. A method for an animal breeder to register an animal with a management organization, which method enables individual identification of an animal by an identifier printed or recorded in some form or another with an animal registration number belonging to the management organization, said method comprising obtaining an identifier from a management organization that includes an animal registration number, reporting the animal registration number included in the identifier to the management organization together with individual information unique to the animal to be registered, registering the reported animal registration number and the individual information in a database of the management organization, and issuing an animal registration certificate by the management organization to the animal breeder that links the animal registration number and the individual information.

2. The method of claim 1, wherein said animal registration number is reported on an animal registration application form attached to said identifier, said animal registration application form being provided with a section for providing the individual information of the animal to be registered, and said management organization storing the attached materials including the individual information of the animal which has been sent to it.

3. The method of claim 2, wherein said individual information is hair of the animal.

4. The method of claim 2, wherein said individual information is a scraping of mucous membrane taken from the animal.

5. The method of claim 2, wherein said individual information is blood, a body fluid, or other biological specimen.

6. The method of claim 1, wherein said animal registration number is reported with an image data of individual information unique to the animal, the animal breeder reporting to the management organization by data communication or by sending a medium containing said data, and said management organization registering the data of said reported animal registration number and individual information in its database.

7. The method of claim 6, wherein the image data of said individual information is an image of the pattern of spots of the body of the animal.

8. The method of claim 6, wherein the image data of said individual information is a nose print of the animal.

9. The method of claim 6, wherein the image data of said individual information is an image of whorls of hair of the face part and torso of the animal.

10. The method of claim 6, wherein the image data of said individual information is an image of an iris of an eye of the animal.

11. The method of claim 2 or claim 6, wherein identification is requested of the person obtaining the individual information unique to said animal.

12. An animal registration management system for registering an animal with a management organization, which system enables individual identification of an animal by an identifier printed or recorded in some form or another with an animal registration number belonging to the management organization, said system comprising means for an animal breeder to obtain an identifier from a management organization that includes an animal identification number, means for reporting the animal registration number included in the identifier to the management organization together with individual information unique to the animal to be registered, means for registering the reported animal registration number and the individual information in a database of the management organization, and means for issuing an animal registration certificate by the management organization that links the animal registration number and the individual information.

13. The animal registration management system of claim 12, wherein said means for reporting is an animal registration application form attached to said identifier, said animal registration application form being provided with a section for providing the individual information of the animal to be registered, and means for the management organization to store the attached materials including the individual information of the animal which has been sent to it.

14. The animal registration management system of claim 13, wherein said individual information is hair of the animal.

15. The animal registration management system of claim 13, wherein said individual information is a scraping of mucous membrane taken from the animal.

16. The animal registration management system of claim 13, wherein said individual information is blood, a body fluid, or other biological specimen.

17. The animal registration management system of claim 12, wherein said means for reporting reports the animal registration number included in said identifier and image data of individual information unique to the animal, the means reporting to the management organization by data communication or by sending a medium containing said data, and said means for registering registers the data of said reported animal registration number and individual information in the database.

18. The animal registration management system of claim 17, wherein the image data of said individual information is an image of the pattern of spots of the body of the animal.

19. The animal registration management system of claim 17, wherein the image data of said individual information is a nose print of the animal.

20. The animal registration management system of claim 17, wherein the image data of said individual information is an image of whorls of hair of the face part and torso of the animal.

21. The animal registration management system of claim 17, wherein the image data of said individual information is an image of an iris of an eye of the animal.

22. The animal registration management system of claim 13 or claim 17, wherein the means for reporting requests identification of the person obtaining the individual information unique to said animal.

* * * * *